(12) United States Patent
Beier

(10) Patent No.: US 11,939,917 B2
(45) Date of Patent: Mar. 26, 2024

(54) APPARATUS FOR OIL LUBRICATION OF A ROTATIONALLY FIXED CONNECTION BETWEEN TWO SHAFTS

(71) Applicant: ROLLS-ROYCE DEUTSCHLAND LTD & CO KG, Blankenfelde-Mahlow (DE)

(72) Inventor: Jürgen Beier, Schulzendorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/869,246

(22) Filed: Jul. 20, 2022

(65) Prior Publication Data
US 2023/0025047 A1    Jan. 26, 2023

(30) Foreign Application Priority Data
Jul. 21, 2021   (DE) ................... 10 2021 118 933.0

(51) Int. Cl.
*F02C 7/06* (2006.01)
*F02C 7/28* (2006.01)
*F02C 7/36* (2006.01)

(52) U.S. Cl.
CPC .............. *F02C 7/06* (2013.01); *F02C 7/28* (2013.01); *F02C 7/36* (2013.01); *F05D 2240/61* (2013.01);
(Continued)

(58) Field of Classification Search
CPC ...... F02C 7/06; F02C 7/28; F02C 7/36; F05D 2240/61; F05D 2250/231; F05D 2250/291; F05D 2260/36; F05D 2260/98
See application file for complete search history.

(56) References Cited

U.S. PATENT DOCUMENTS

| 4,281,942 A | 8/1981 | Gaeckle et al. |
| 5,119,905 A | 6/1992 | Murray |
| (Continued) | | |

FOREIGN PATENT DOCUMENTS

DE    102016108068 A1    11/2017

OTHER PUBLICATIONS

German Search Report dated Nov. 22, 2021 from counterpart Geman Patent Application No. 10 2021 118 933.0.

*Primary Examiner* — Steven M Sutherland
(74) *Attorney, Agent, or Firm* — SHUTTLEWORTH & INGERSOLL, PLC; Timothy J. Klima

(57) ABSTRACT

An apparatus for oil lubrication of a rotationally fixed connection between two shafts. A first shaft engages with a hollow region of the second shaft. The shafts are operatively connected to each other in a form-fitting manner in the overlapping region. Oil is introduced into a first chamber in the hollow region, which chamber is connected to a second chamber in the hollow region. The second chamber is connectable to a third chamber is arranged in the overlapping region. The fluidic connection between the second chamber and the third chamber is separated above a defined oil volume in the second chamber and above a rotational speed threshold of the shafts via a sealing element. The sealing element is reversibly deformable by the oil volume in the second chamber and the centrifugal force acting thereon and, in the deformed state, seals the connection between the second and third chambers.

17 Claims, 9 Drawing Sheets

(52) U.S. Cl.
CPC .. *F05D 2250/231* (2013.01); *F05D 2250/291* (2013.01); *F05D 2260/36* (2013.01); *F05D 2260/98* (2013.01)

(56) References Cited

U.S. PATENT DOCUMENTS

| | | |
|---|---|---|
| 2004/0016601 A1 | 1/2004 | Brouillet |
| 2008/0035428 A1 | 2/2008 | Omoto et al. |
| 2014/0161591 A1* | 6/2014 | Venter .................. F16H 57/043 |
| | | 184/6.12 |
| 2020/0056507 A1 | 2/2020 | Walker |
| 2020/0102854 A1 | 4/2020 | Lighty et al. |

\* cited by examiner

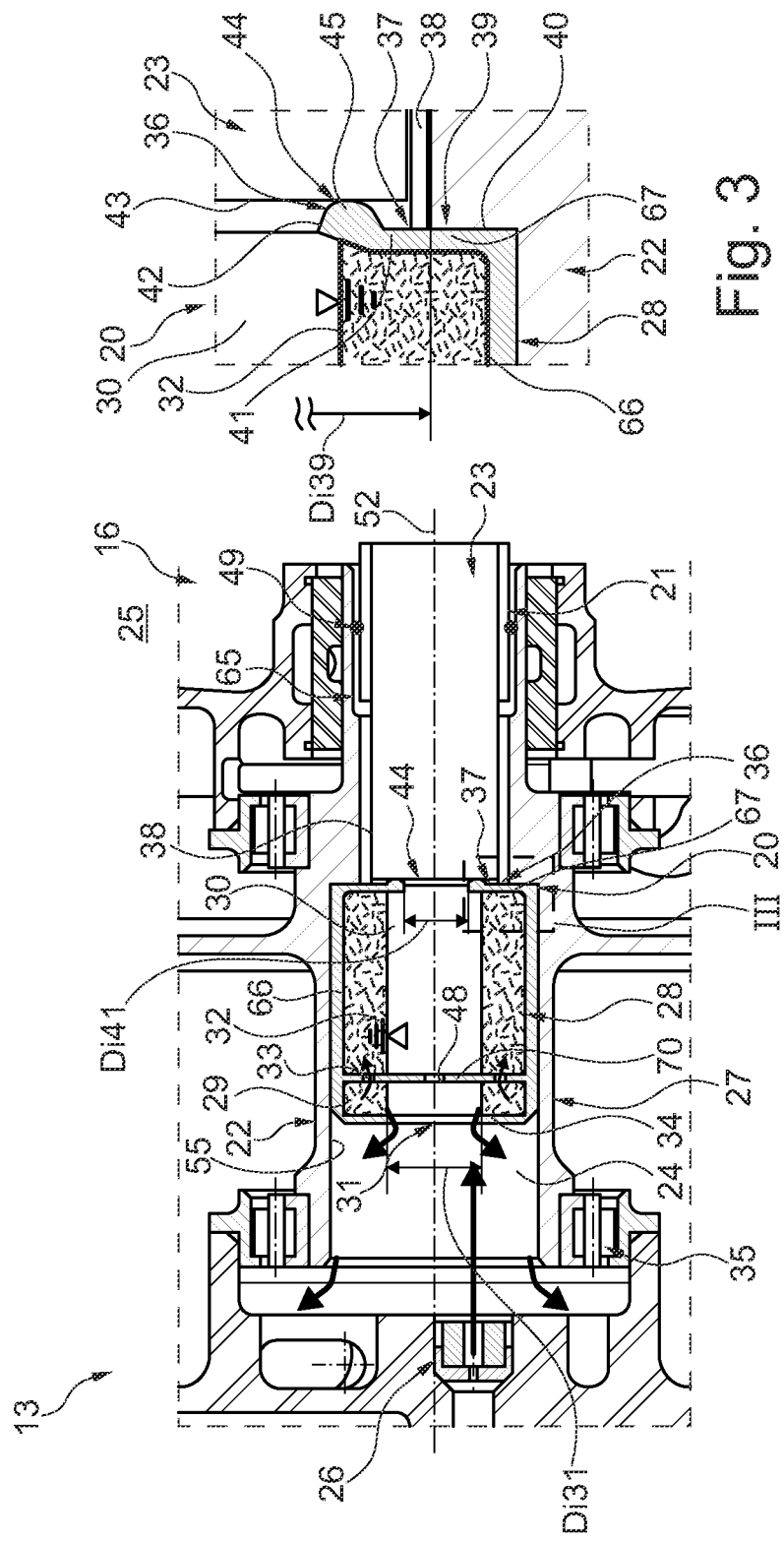

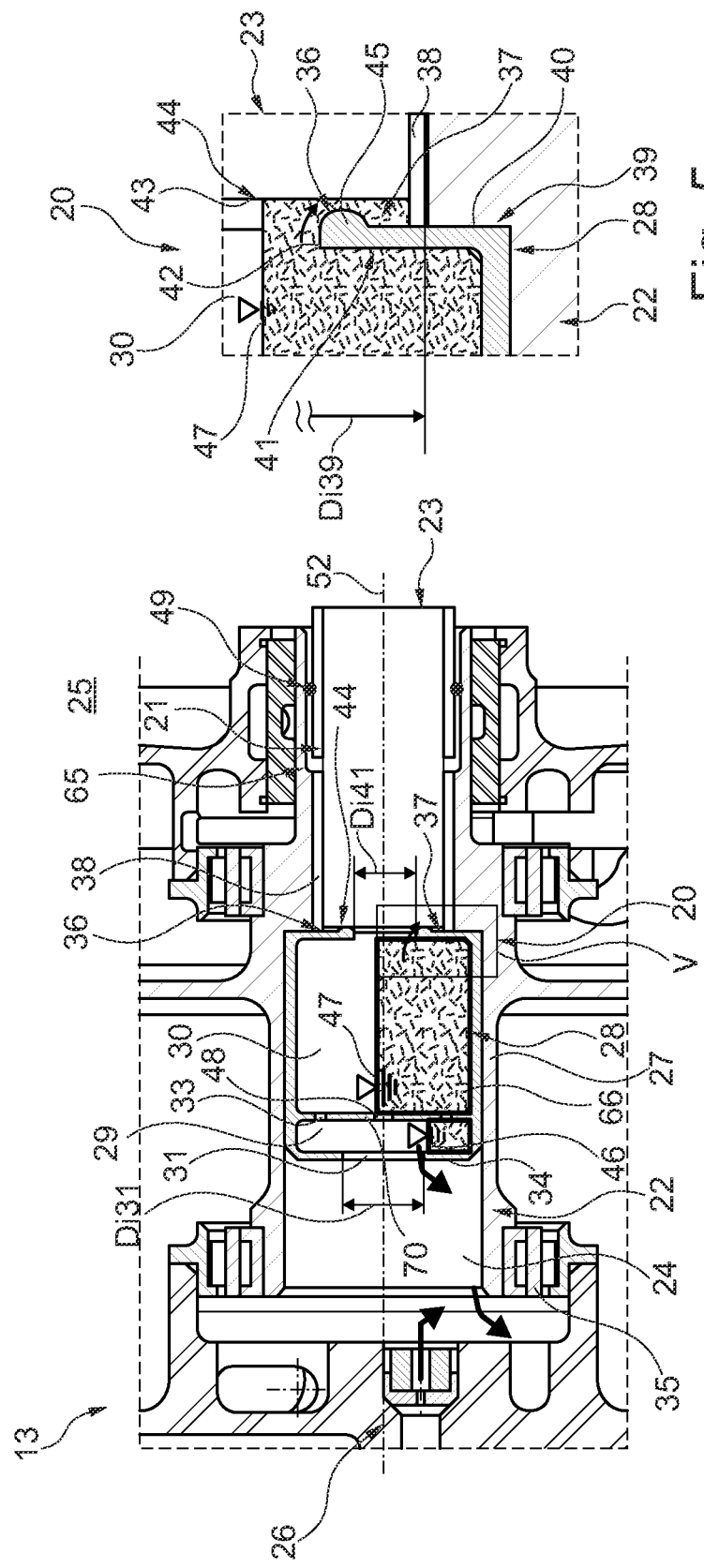

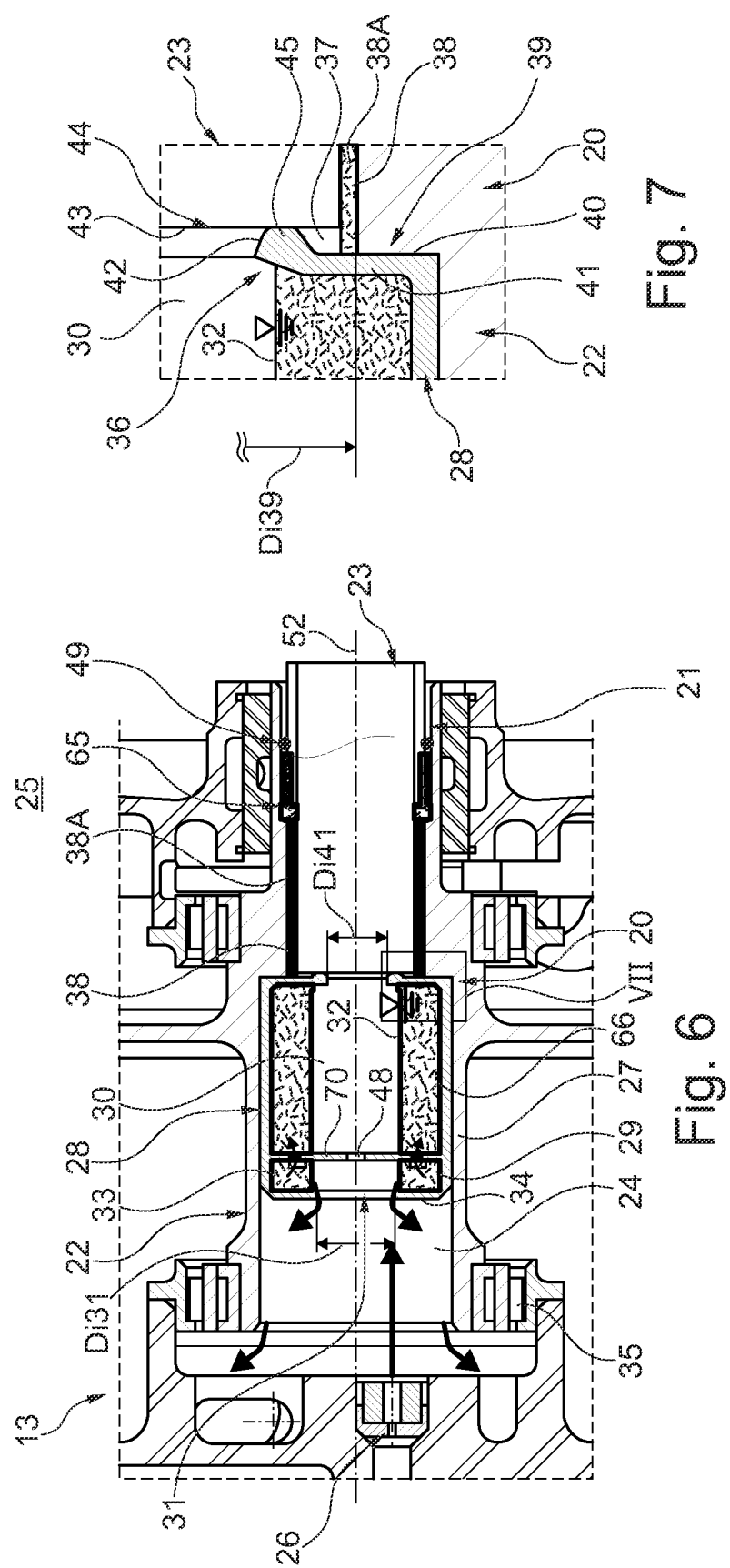

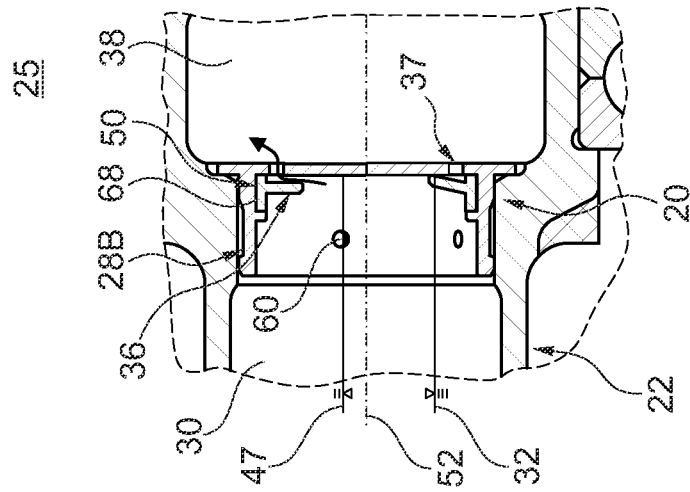
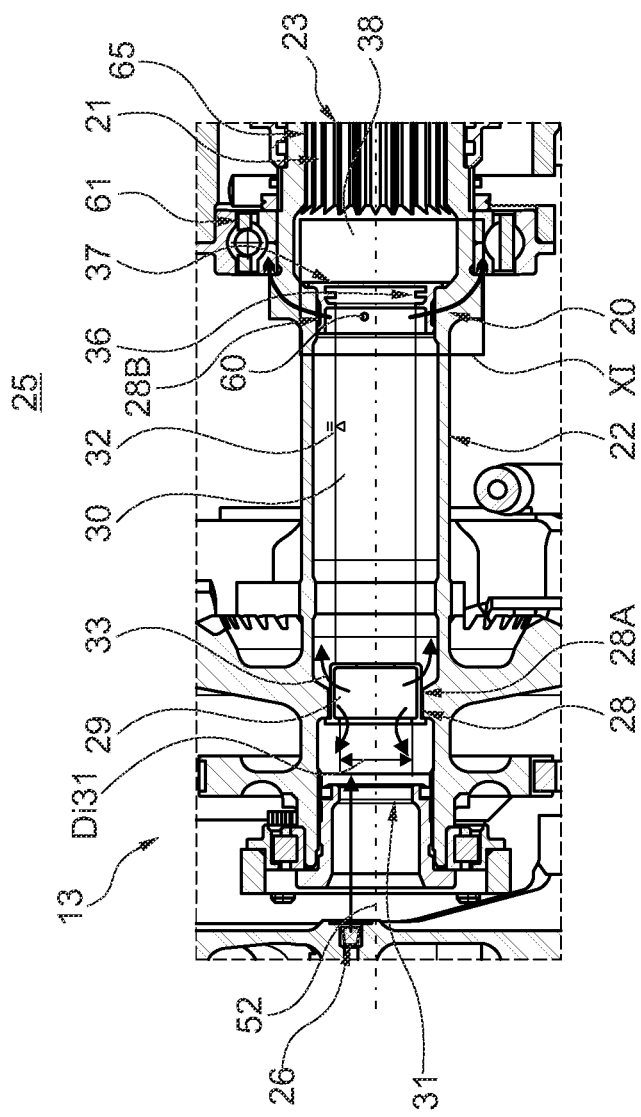

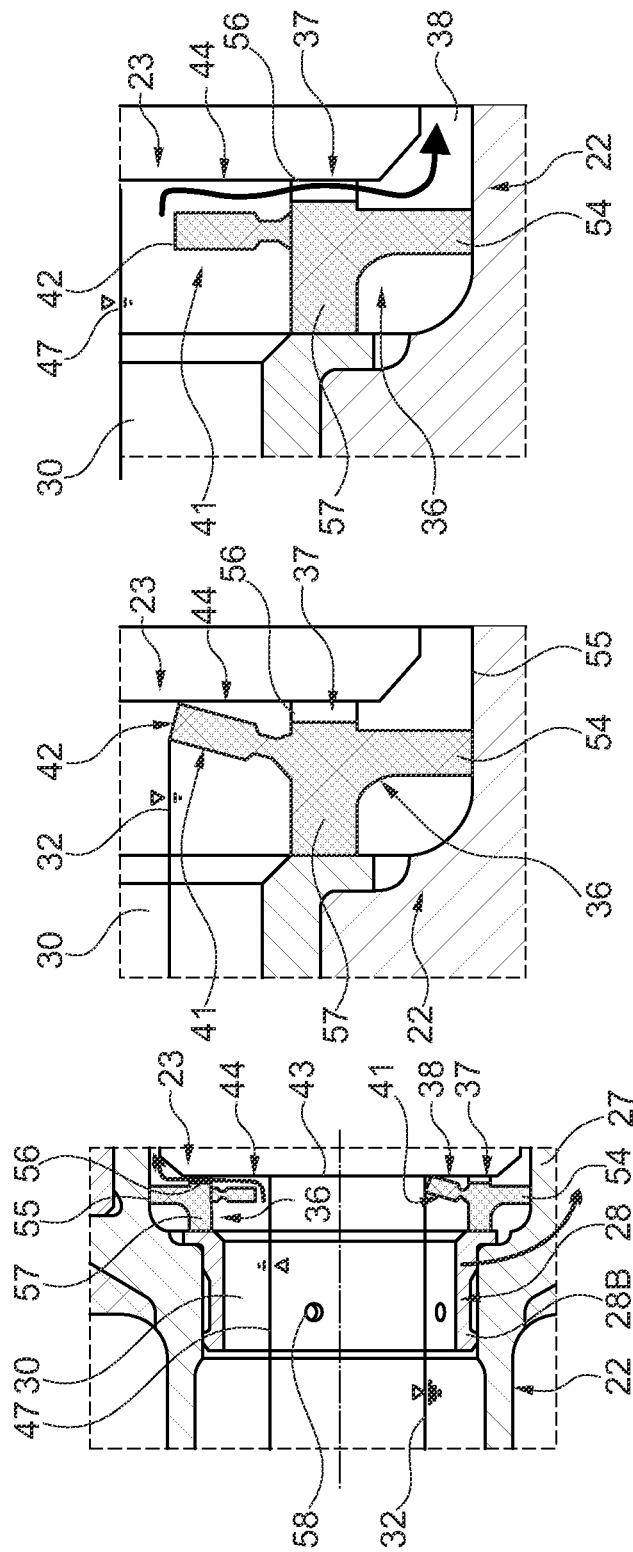

APPARATUS FOR OIL LUBRICATION OF A ROTATIONALLY FIXED CONNECTION BETWEEN TWO SHAFTS

This application claims priority to German Patent Application DE102021118933.0 filed Jul. 21, 2021, the entirety of which is incorporated by reference herein.

The present disclosure relates to an apparatus for oil lubrication of a rotationally fixed connection between two shafts, wherein a first shaft engages with a shaft region in a hollow-cylindrical shaft region of the second shaft, and the shafts are operatively connected to each other in a form-fitting manner in the overlapping region.

Gas turbine engines with gearboxes or what are referred to as auxiliary unit gearboxes are well known in practice. Various auxiliary units which are provided for the operation of a gas turbine engine and of an aircraft designed therewith are conventionally driven via such auxiliary unit gearboxes. Examples of the auxiliary units include a fuel system, a generator or a hydraulic pump unit, with an electric system and a hydraulic system of an aircraft being able to be operated via the auxiliary units last mentioned. At least one drive shaft of said auxiliary units is driven directly via a drive shaft of the auxiliary unit gearbox which is connected to the drive shaft of the auxiliary unit in a form-fitting manner and for rotation therewith. The form-fitting connection between the drive shafts is conventionally designed as a splined joint which should be acted upon with lubricant in order to avoid wear in the region of the tooth engagements of the splined joint.

For this purpose, in the case of known auxiliary unit gearboxes, oil is introduced or injected into a hollow-cylindrical shaft region of the drive shaft of the auxiliary unit gearbox. From there, oil passes, depending on the operating state, in the interior of the drive shaft of the auxiliary unit gearbox to the splined joint between the drive shafts. During operation, the pressure in the auxiliary unit gearbox is higher than the ambient pressure of the auxiliary unit gearbox. For this reason, the auxiliary unit gearbox is sealed in relation to the environment in order to avoid oil escaping.

Furthermore, during operation, a constant oil volume flow is introduced into the hollow-cylindrical region of the drive shaft of the auxiliary unit gearbox. At least one oil distributor is provided in the interior of the drive shaft of the auxiliary unit gearbox. The oil distributor is provided for distributing the oil in the circumferential direction of the drive shaft and, in the interior of the drive shaft of the auxiliary unit gearbox, bounds a plurality of chambers which are fluidically connected to one another in order to exchange oil. If the oil volume in a first chamber of such an oil distributor, into which the oil is introduced by the oil feed unit, reaches a defined oil level, the oil passes from the first chamber via outlet bores into a second chamber which is connected to a third chamber. The splined joint is provided in the third chamber and is thus supplied with oil from the first chamber and lubricated. In addition, the chambers are also connected to one another via venting bores via which air is exchanged and pressure equalized between the chambers. In addition, the oil which is introduced into the oil distributor via the oil feed unit also flows out of the first chamber back into the interior of the auxiliary unit gearbox and is used, for example, for lubrication and cooling, and is collected in an oil sump and recycled into an oil circuit.

During operation of the auxiliary unit gearbox and of the gas turbine engine designed therewith, the drive shaft of the auxiliary unit gearbox and the drive shaft of the auxiliary unit rotate at a correspondingly high rotational speed. The oil volume then present in each case in the chambers is pressed by the acting centrifugal force against the oil distributor walls bounding the chambers and is applied circumferentially to the outer diameters of the chambers. If a gas turbine engine is switched off, the rotational speed of the drive shafts of the auxiliary unit gearbox and of the secondary units is reduced and the centrifugal force acting on the oil decreases. Furthermore, the oil volume flow supplied via the oil feed unit also decreases.

The oil volume collects in the lower regions of the chambers if the oil is no longer pressed outwards by the centrifugal force counter to the acting weight force or gravitational force. The oil volume in the third chamber then exceeds what is referred to as an oil barrier or a bulkhead which extends in the circumferential direction and in the radial direction from the outer circumference of the second chamber inwards between the second chamber and the third chamber. At least a small oil volume then flows out of the second chamber into the third chamber. The splined joint between the drive shaft of the auxiliary unit gearbox and the drive shaft of the auxiliary unit is acted upon there with the oil and lubricated. If the gas turbine engine is started again, there is an oil volume in the region of the splined joint between the shafts, the oil volume limiting or preventing the wear in the region of the splined joint.

A seal is provided in the region of the splined joint in order to avoid an undesired escape of oil from the auxiliary unit gearbox in the direction of the environment of the auxiliary unit gearbox via the splined joint. Such an escape of oil is assisted by the difference in pressure between the interior of the auxiliary unit gearbox and the environment. In the event of a reduction in the sealing power of the seal, oil is entrained by the air volume flow flowing out of the auxiliary unit gearbox in the direction of the environment through the splined joint due to the difference in pressure. However, this has an adverse effect on the duration of supplying oil to the gas turbine engine and is also undesirable from environmental aspects.

The present disclosure is therefore based on the object of providing a device for oil lubrication of a rotationally fixed connection between two shafts, preferably shafts of a gas turbine engine, by means of which a permanent supply of oil to the gas turbine engine is ensured in a structurally simple manner.

This object is achieved by an apparatus having features as disclosed herein.

A device for oil lubrication of a rotationally fixed connection between two shafts, preferably between a drive shaft of an auxiliary unit gearbox and a drive shaft of an auxiliary unit of a gas turbine engine of an aircraft is proposed.

A first shaft engages with a shaft region in a hollow-cylindrical shaft region of a second shaft. The shafts are operatively connected to each other in a form-fitting manner, preferably via a splined joint, in the overlapping region. Oil can be introduced in the axial direction through a central opening into a first chamber in the hollow-cylindrical region of the second shaft. For this purpose, for example, an oil nozzle or the like can be provided for an oil feed unit via which the oil is introduced or injected into the first chamber.

The first chamber is fluidically connected to a second chamber in the hollow-cylindrical region of the second shaft. The second chamber is in turn fluidically connected to a third chamber. The third chamber is arranged in the overlapping region between the first shaft and the second shaft.

The fluidic connection between the second chamber and the third chamber is separated above a defined oil volume in the second chamber and above a rotational speed threshold of the rotational speed of the shafts via a sealing element. The sealing element is reversibly deformable at least in regions by the oil volume in the second chamber and the centrifugal force acting thereon. In the deformed state, the sealing element seals the connection between the second chamber and the third chamber in relation to the second chamber.

With the apparatus according to the present disclosure, an oil volume flow from the second chamber into the third chamber and therefore to the form-fitting connection between the two shafts depending on the rotational speed is prevented and, depending on the rotational speed of the shafts, lubrication of the form-fitting connection between the two shafts is permitted, in a structurally simple manner during operation of a gas turbine engine. It is of advantage here that the oil-conducting region is sealed above the rotational speed threshold in a region in which the sealing action of the sealing element is permanently available irrespective of axial and/or radial deflections of the two shafts with respect to each other and therefore with little outlay.

In addition, an undesirable loss of oil from the interior of the auxiliary unit gearbox in the direction of an environment of the shafts which are connected in a rotationally fixed manner to each other is prevented in a simple manner and at the same time the rotationally fixed connection between the two shafts is lubricated with oil.

In an embodiment of the apparatus according to the present disclosure, the inside diameter of the central opening, the outside diameter of the first chamber, the outside diameter of the second chamber and the arrangement of the connections between the chambers are coordinated with one another in such a manner that, above the rotational speed threshold of the shafts, a defined oil level in each case arises in the first chamber and in the second chamber. In addition, the design in such an embodiment of the apparatus is such that the sealing element is reversibly deformed at least in regions by the oil volume in the second chamber and the centrifugal force acting thereon and reliably seals the connection between the second chamber and the third chamber during operation of a gas turbine engine.

The sealing element can have an annular disk region which projects radially inwards into the second chamber and on which the oil volume present in the second chamber is supported in the axial direction. At least one free inner edge region of the annular disk region can be pressed by the oil volume in the second chamber in the axial direction against a shaft end of the first shaft or against a boundary wall or partition of the hollow-cylindrical region of the second shaft, said boundary wall or partition bounding the second chamber and the third chamber, and can seal the connection between the second chamber and third chamber if an oil volume above the defined oil volume is present in the second chamber and the rotational speed of the shafts is greater than the rotational speed threshold. The oil path between the second chamber and the third chamber, and the form-fitting connection between the two shafts are then sealed or opened up, depending on the rotational speed, without an additional outlay on control and regulation.

The inner edge region of the annular disk region of the sealing element can be designed with a sealing bead which is extended in the circumferential direction of the sealing element and is provided on the side which faces the shaft end of the first shaft or the boundary wall. Such a sealing element provides a good sealing action with the sealing bead since the sealing bead lies over as wide a region as possible against the shaft end or against the boundary wall when the sealing element is pressed against the provided contact surface or sealing surface of the shaft end or of the boundary wall and is correspondingly deformed in the process.

The connection between the first chamber and the second chamber can comprise at least one passage opening. The passage opening can run from the outside diameter of the first chamber in the direction of the second chamber or in the radial direction between the outside diameter of the first chamber and the inside diameter of the central opening in the direction of the second chamber. The effect thereby achieved in a simple manner is that oil is conducted out of the first chamber in the direction of the second chamber as soon as a defined oil volume accumulates in the first chamber or a defined oil level arises there.

It is possible here for the passage opening to be provided in a radial wall region which separates the first chamber from the second chamber in the axial direction of the shafts. The wall region can be provided, for example, in the region of a oil distributor in the interior of the second shaft.

The inside diameter of the annular disk region of the sealing element can at least approximately correspond to the inside diameter of the central opening of the first chamber and is preferably smaller than the inside diameter of the central opening. The effect thereby achieved in a simple manner is that the defined oil volume which is required for achieving the sealing action of the sealing element arises in the second chamber.

In a further embodiment of the apparatus according to the present disclosure, the chambers are bounded at least by a hollow-cylindrical component which is arranged in the hollow-cylindrical region of the second shaft and is connected fixedly to the second shaft and is preferably rotationally symmetrical and designed, for example, as an oil distributor.

In an embodiment of the apparatus according to the present disclosure that is easy to fit, the sealing element is formed integrally with the hollow-cylindrical component.

The sealing element can lie in the axial direction on an annular contact surface of a step of the second shaft. The contact surface of the step can be spaced apart in the axial direction from the shaft end of the first shaft. The diameter of the contact surface can be greater than the inside diameter of the annular disk region of the sealing element. It is then ensured, with little structural outlay that, with an appropriate oil volume in the second chamber and above the rotational speed threshold of the rotational speed of the shafts, the sealing element is placed in a sealing manner against the shaft end of the first shaft or against the boundary wall in order to prevent an undesirable outflow of oil from the second chamber into the third chamber. The boundary wall may also be part of the hollow-cylindrical component.

The sealing element can comprise at least one flat sealing disk region which is arranged between an end face of the hollow-cylindrical component and the contact surface of the step. This embodiment of the apparatus according to the present disclosure can be integrated with little structural outlay in existing systems or gas turbine engine systems in order to avoid an undesirable outflow of oil from the interior of the auxiliary unit gearbox in the direction of the environment.

The sealing element can be arranged with a radial outer region in an inner groove of the hollow-cylindrical component or of the second shaft and can be connected fixedly to the hollow-cylindrical component or to the second shaft. Such a development of the apparatus according to the present disclosure can likewise be integrated with little structural outlay in existing gas turbine engine systems or existing auxiliary unit gearboxes.

The hollow-cylindrical component can be designed in two parts. The parts of the hollow-cylindrical component can be arranged in the hollow-cylindrical region of the second shaft in a manner spaced apart from each other in the axial direction of the shafts, and the second chamber can be provided between the parts of the hollow-cylindrical component in the axial direction of the shafts.

In addition, the sealing element can be supported with a radially outer region on the second shaft, with an axial region on the shaft end of the first shaft, and with a further axial region on the hollow-cylindrical component. The annular-disk-shaped region of the sealing element can be placed by the oil volume in the second chamber against the shaft end of the first shaft in a sealing manner and can separate a connection between the second chamber and the third chamber, which connection runs through the axial region of the sealing element. With a sealing element designed in such a manner, axial distances or manufacturing tolerances can be compensated for via the sealing element in a structurally simple manner, and a high sealing action can be provided via the sealing element.

The sealing element can be designed as a sealing element which is spring-elastic at least in regions and which is produced, for example, from rubber, composite material, PTFE, from silicone, from correspondingly spring-elastic metal or the like. The sealing element can comprise a flexible inner sealing lip which, below the rotational speed threshold, opens up a gap between the second chamber and the third chamber in order to introduce oil from the second chamber into the third chamber and to be able to act upon, and lubricate, the form-fitting connection between the shafts with oil to the desired extent.

Above the rotational speed threshold and above a corresponding oil volume in the second chamber, the flexible inner sealing lip of the sealing element is deformed by the prevailing hydraulic pressure and pressed in a sealing manner against the shaft end of the first shaft or against the boundary wall, as a result of which reliable sealing against an undesirable escape of oil from the second chamber into the third chamber is achieved.

A nominal gap between the sealing lip and the sealing surface, i.e. the sealing surface of the shaft end of the first shaft or of the boundary wall, can have a gap width of 0.5 mm to approximately 1 mm if the rotational speed of the shafts is lower than the rotational speed threshold. The desired oil volume flow can then be introduced through the gap from the second chamber into the third chamber.

The spring elasticity of the sealing element can be provided in such a manner that the sealing element lifts off the sealing surface in the region of the shaft end of the shaft or of the boundary wall and opens up the connection between the second chamber and the third chamber if the rotational speed of the shafts falls below the rotational speed threshold. During normal operation of a gas turbine engine, an oil volume has accumulated previously in the second chamber such that the static oil level in the second chamber, which oil level arises at rotational speeds of the shafts below the rotational speed threshold in the second chamber, exceeds the inner edge region of the sealing element and oil flows out of the second chamber via the connection into the third chamber and therefore in the direction of the rotationally fixed connection between the shafts.

This means in turn that, once the hydraulic pressure arising as a result of centrifugal force falls short of a defined value, the sealing element is reversibly reset or springs back and the sealing action of the sealing element is stopped.

It is self-evident to a person skilled in the art that a feature described with reference to one of the above aspects may be applied to any other aspect, unless these are mutually exclusive. Furthermore, any feature described here may be applied to any aspect and/or combined with any other feature described here, unless these are mutually exclusive.

Exemplary embodiments will now be described with reference to the figures, wherein, for the sake of clarity, in the description below of the various exemplary embodiments, the same reference signs are used for components with the same function and structure.

In the Figures:

FIG. 2 shows a partial longitudinal sectional view in the region of the auxiliary unit gearbox according to FIG. 1a and FIG. 1b, in which there is a rotationally fixed connection between a drive shaft of the auxiliary unit gearbox and a drive shaft of an auxiliary unit, wherein the gas turbine engine is in the switched-on operating state;

FIG. 3 shows an enlarged view of a region III, indicated specifically in FIG. 2;

FIG. 4 shows an illustration, corresponding to FIG. 2, of the region of the auxiliary unit gearbox in the switched-off state of the gas turbine engine during a discharge operating state of the gas turbine engine;

FIG. 5 shows an illustration, corresponding to FIG. 3, of the region Ill in the operating state of the gas turbine engine, on which the illustration according to FIG. 4 is based;

FIG. 6 shows an illustration, corresponding to FIG. 2, of the auxiliary unit gearbox in an operating state which the auxiliary unit gearbox is in after renewed starting of the gas turbine engine;

FIG. 7 shows an illustration, corresponding to FIG. 3, of the region Ill in an operating state of the auxiliary unit gearbox, on which the illustration according to FIG. 6 is based;

FIG. 10 shows an illustration, corresponding to FIG. 2, of a further embodiment of the auxiliary unit gearbox, wherein the sealing element is arranged in an inner groove of the oil distributor;

FIG. 11 shows an enlarged view of a region XI, indicated specifically in FIG. 10;

FIG. 15 shows an enlarged view of a development of the embodiment, illustrated in FIG. 10, of the auxiliary unit gearbox;

FIG. 16 shows an enlarged view of a region XVI, indicated specifically in FIG. 15; and FIG. 17 shows an illustration, corresponding to FIG. 16, of the region XVI in an operating state of the sealing element, in which a connection between a second chamber and a third chamber is opened up by the sealing element.

Figure 1A:
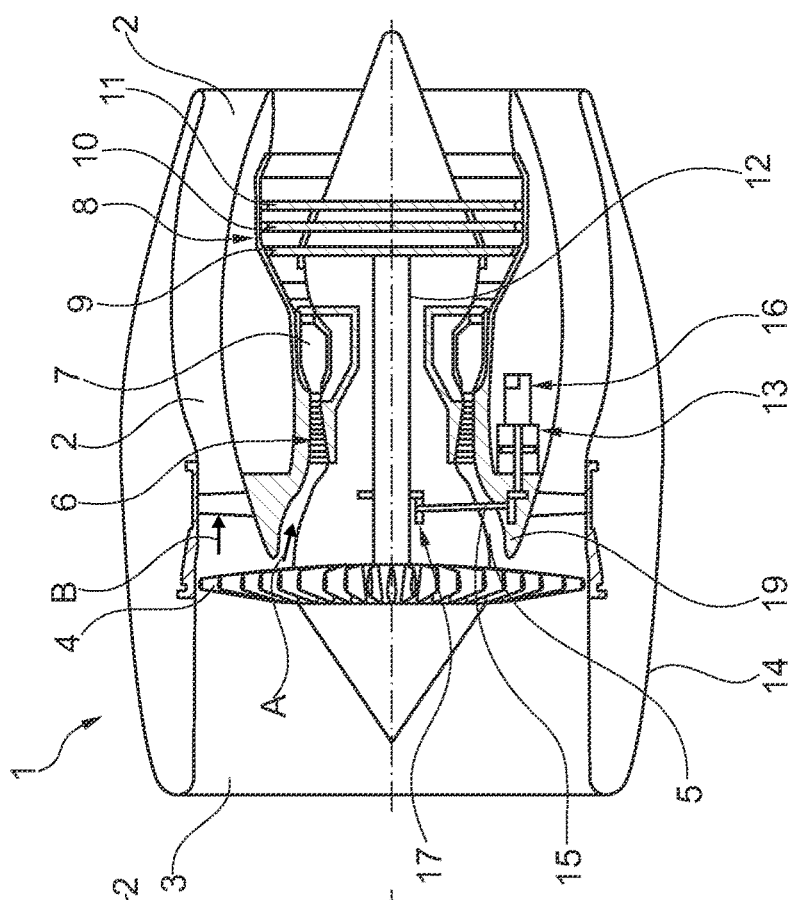
FIG. 1a shows a highly schematized longitudinal sectional view of a gas turbine engine with an auxiliary unit gearbox arranged in the blower housing.
Figure 1B:
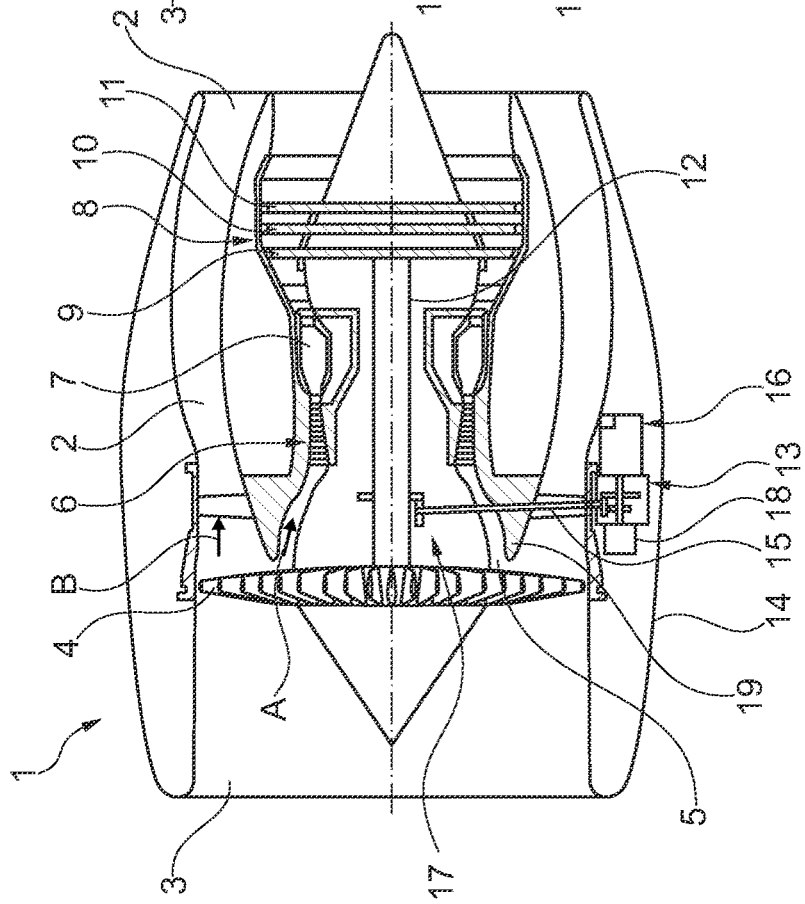
FIG. 1b shows an illustration, corresponding to FIG. 1a, of a gas turbine engine with an auxiliary unit gearbox mounted in the region of the engine core.

FIG. 1a and FIG. 1b both show a gas turbine engine 1 in a longitudinal sectional view. The gas turbine engine 1 is formed with a bypass channel 2 and an inlet region 3, wherein a blower 4 adjoins the inlet region 3 downstream in a manner known per se. Downstream of the blower 4, in turn, the fluid flow in the gas turbine engine 1 is divided into a bypass flow B and a core flow A, the bypass flow B flowing through the bypass channel 2 and the core flow A flowing into an engine core 5. The engine core 5 is designed in a manner known per se with a compressor device 6, a burner 7 and a turbine device 8. The turbine device 8 comprises a plurality of rotors 9, 10 and 11 which are configured with a substantially comparable design and are connected to an engine shaft 12.

In the embodiment of the gas turbine engine 1 according to FIG. 1a, an auxiliary unit gearbox 13 is arranged in an outer engine housing 14. The engine housing 14 bounds the bypass channel 2 and is the outer circumferential region of the gas turbine engine 1. The auxiliary unit gearbox 13 here is connected via an inner gearbox 17, via a drive shaft 15 running in the radial direction of the gas turbine engine 1, to the engine shaft 12 and is therefore driven, and supplied with torque, by the engine shaft 12 during operation of the gas turbine engine 1. Various auxiliary units 16 are acted upon to the desired extent with torque by the auxiliary unit gearbox 13. In addition, an oil tank 18 is also provided in the region of the auxiliary unit gearbox 13, the oil tank being a hydraulic fluid reservoir from which oil is extracted for cooling and lubricating various regions of the gas turbine engine 1, such as bearing devices, gearwheel pairings of the inner gearbox 17 and the auxiliary unit gearbox 13, and further assemblies of the gas turbine engine 1 that are to be cooled and to be lubricated.

In contrast thereto, the auxiliary unit gearbox 13 with the auxiliary units 16 is arranged in the radial direction between the bypass channel 2 and the engine core 5, in the case of the gas turbine engine 1 according to FIG. 1b, in a component 19 bounding both the bypass channel 2 and the engine core 5.

FIG. 2 shows a partial longitudinal sectional view of the auxiliary unit gearbox 13 and one of the auxiliary units 16. The region of the auxiliary unit gearbox 13 that is illustrated in FIG. 2 comprises an apparatus 20, shown specifically in FIG. 3, for oil lubrication of a rotationally fixed connection 21 between two shafts 22, 23. The rotationally fixed connection is designed here as a splined joint in an overlapping region 65 between the two shafts 22 and 23 and is intended, in a manner described in more detail below, to be supplied in a targeted manner with oil and lubricated, without causing an undesirable escape of oil from an interior 24 of the auxiliary unit gearbox 13 to an environment 25.

An oil feed unit 26 is provided via which oil is introduced or injected or even sprayed, depending on the application, into a hollow-cylindrical region 27 of the shaft 22, which is the drive shaft of the auxiliary unit gearbox 13. An oil divider 28 is inserted here into the hollow-cylindrical region 27 of the shaft 22, the oil divider being designed as a substantially rotationally symmetrical, hollow-cylindrical component and bounding a first chamber 29 and a second chamber 30. The oil divider 28 is formed with a central opening 31 through which oil is introduced here in the form of an oil jet by the oil feed unit 26 into the first chamber 29.

An inside diameter Di31 of the central opening 31 of the oil divider 28 or of the first chamber 29 is provided in such a manner that, during operation of the gas turbine engine 1, a defined oil volume or what is referred to as a dynamic oil level 32 arises in the first chamber 29 and in the second chamber 30 above a defined rotational speed threshold of the shafts 22 and 23. The first chamber 29 and the second chamber 30 are connected to each other via connecting passages or connecting bores 33 which lead through a radial wall region 70 between the chambers 29 and 30. Oil is introduced from the first chamber 29 via the connecting bores 33 into the second chamber 30 when the dynamic oil level 32 in the first chamber 29 reaches the radial level of the connecting bores 33. The oil volume present in each case in the chambers 29 and 30 is applied in the manner illustrated in FIG. 2, because of the centrifugal force acting on the oil volume, to the outer circumference 66 of the oil divider 28 and therefore of the chambers 29 and 30. If the dynamic oil level 32 in the first chamber 29 circumferentially exceeds an inner ring region 34 of the central opening 31, oil flows back out of the first chamber 29 into the hollow-cylindrical region 27 of the shaft 22 and is supplied, for example, for lubricating and cooling a bearing unit 35 of the shaft 22.

In the last-mentioned operating state of the apparatus 20, the oil volume present in the second chamber 30 in conjunction with the centrifugal force acting thereon has the effect that a sealing element 36, which is formed integrally with the oil divider 28 in a region facing the shaft 23, is reversibly deformed in the manner shown specifically in FIG. 3. In the deformed state, the sealing element 36 closes a connection 37 between the second chamber 30 and a third chamber 38 in a sealing manner. The sealing element 36 lies with a flat sealing disk region 67 against an axial stop 39 of the shaft 22 or against a stop surface 40. An inside diameter Di39 of the axial stop 39 here is greater than an inside diameter Di41 of an annular disk region 41, projecting radially inwards into the second chamber 30, of the sealing element 36, which region comprises the flat sealing disk region 67. A free inner edge region 42 of the sealing element 36 can therefore be pressed by the oil volume in the second chamber 30 in the axial direction against an end face 43 of a shaft end 44 of the shaft 23 since the sealing element 36 in this region is not supported in the axial direction by the axial stop 39. The annular disk region 41 is then distorted by the oil volume in the second chamber 30 and the centrifugal force acting thereon above the stop surface 40 in the direction of the shaft end 44.

The inner edge region 42 of the sealing element 36 is formed on the side facing the shaft end 44 of the shaft 23 with a sealing bead or sealing lip 45 which constitutes an enlarged material region of the sealing element 36. As large a sealing surface as possible is achieved in the circumferential direction and in the radial direction between the sealing element 36 and the shaft end 44 or the end face 43 of the shaft end 44, as is a high sealing action, by means of the sealing bead 45.

FIG. 4 shows an illustration, corresponding to FIG. 2, of the auxiliary unit gearbox 13 and of the auxiliary unit 16 during an operating state of the gas turbine engine 1 in which the gas turbine engine 1 and the auxiliary unit gearbox 13 are in after the gas turbine engine 1 is switched off and during a discharge operation of the gas turbine engine 1. In the operating state which is shown, the rotational speed of the shafts 22 and 23 is already lower than the rotational speed threshold. If the rotational speed of the shafts 22 and 23 falls below the rotational speed threshold, the oil volume present in each of the chambers 29 and 30 in each case accumulates in the lower regions of the chambers 29 and 30 in the manner shown in FIG. 4 because of the acting weight force. The what are referred to as static oil levels 46 and 47 then arise in the chambers 29 and 30.

The static oil level 46 in the first chamber 29 depends on the inside diameter Di31 of the central opening 31 through which the oil then immediately flows out of the first chamber 29 into the hollow-cylindrical region 27 of the shaft 22. The height of the static oil level 46 corresponds to the radial height from the lower region of the first chamber 29 as far as the lower edge of the central opening 31.

The static oil level 47 arises in the second chamber 30 during the discharge operation of the gas turbine engine 1 owing to the fact that the oil flows out of the second chamber 30 counter to the resistance of the oil volume present in the first chamber 29 and, given a corresponding static filling level, also via a central venting bore 48 into the first chamber 29. The oil therefore flows out of the second chamber 30 substantially more slowly than out of the first chamber 29, and therefore the static oil level 47 is higher, at least for a limited period of time, than the static oil level 46 in the first chamber 29.

During normal operation of the gas turbine engine 1, air is conducted out of the second chamber 30 into the first chamber 29 via the venting bore 48 in order to avoid an undesirable increase in pressure in the second chamber 30. Such an increase in pressure in the second chamber would otherwise prevent oil from being admitted from the first chamber 29 via the venting bore 33 into the second chamber 30 and impair the sealing action, described in more detail above, of the sealing element 36 due to too low an oil level 32 in the second chamber 30.

Owing to the decreasing rotational speed of the shafts 22, 23 and the resultant reduction in centrifugal force, the oil pressure which bears in the axial direction against the sealing element 36 also decreases. Since the sealing element 36 is designed with corresponding spring elasticity and a corresponding restoring behavior which counteracts the oil pressure in the axial direction of the shafts 22 and 23, the free inner edge region 42 of the sealing element 36 springs back under the rotational speed threshold of the shafts 22 and 23 into the position illustrated in FIG. 5. In the process, the sealing element 36 lifts off the end face 43 of the shaft end 44 of the shaft 23 and opens up the connection 37 between the second chamber 30 and the third chamber 38. In this operating state, the annular disk region 41 again has a rectilinear and substantially uncurved profile above the stop surface 40 in the radial direction of the shafts 22, 23.

As long as the static oil level 47 in the second chamber 30 lies above the lower region of the free inner edge region 42 of the sealing element 36, oil flows out of the second chamber 29 via the free inner edge region 42 and through the connection 37 into the third chamber 38. The oil passes from there to the rotationally fixed connection or to the splined joint 21 between the two shafts 22 and 23, and therefore the rotationally fixed connection 21 is supplied to the desired extent with oil and lubricated.

If the gas turbine engine 1 is put into operation again at a later time, the rotational speed of the shafts 22 and 23 increases to values above the rotational speed threshold, and the first chamber 29 and the second chamber 30 are filled again with oil by the oil feed unit 26. If the dynamic oil level 32 in the two chambers 29 and 30 reaches the level shown in FIG. 2 and FIG. 6, the sealing element 36 is pressed by the oil volume in the second chamber 30, in turn, to the extent illustrated in FIG. 7, in a sealing manner against the end face 43 of the shaft end 44 and separates the fluidic connection between the second chamber 30 and the third chamber 38. During operation of the gas turbine engine 1, oil is therefore reliably prevented by the sealing element 36 from escaping from the second chamber 30 into the third chamber 38. In addition, in the region of the splined joint or the rotationally fixed connection 21 between the shafts 22 and 23, a further seal 49 is provided which prevents oil from escaping out of the third chamber 30, in which there is now already a certain oil volume 38A, in the direction of the environment 25.

However, if the gas turbine engine 1 is switched off, the third chamber 38 is acted upon with oil to the extent illustrated specifically in FIG. 4 and FIG. 5 again via the connection 37 between the second chamber 30 and the third chamber 38 when the sealing element 36 transfers from its sealing operating state into its operating state opening up the connection 37.

Figure 9:
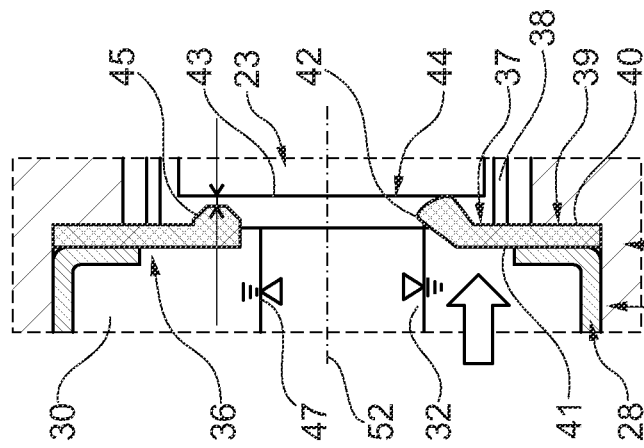
FIG. 9 shows an enlarged illustration of a region IX, indicated specifically in FIG. 8.
Figure 8:
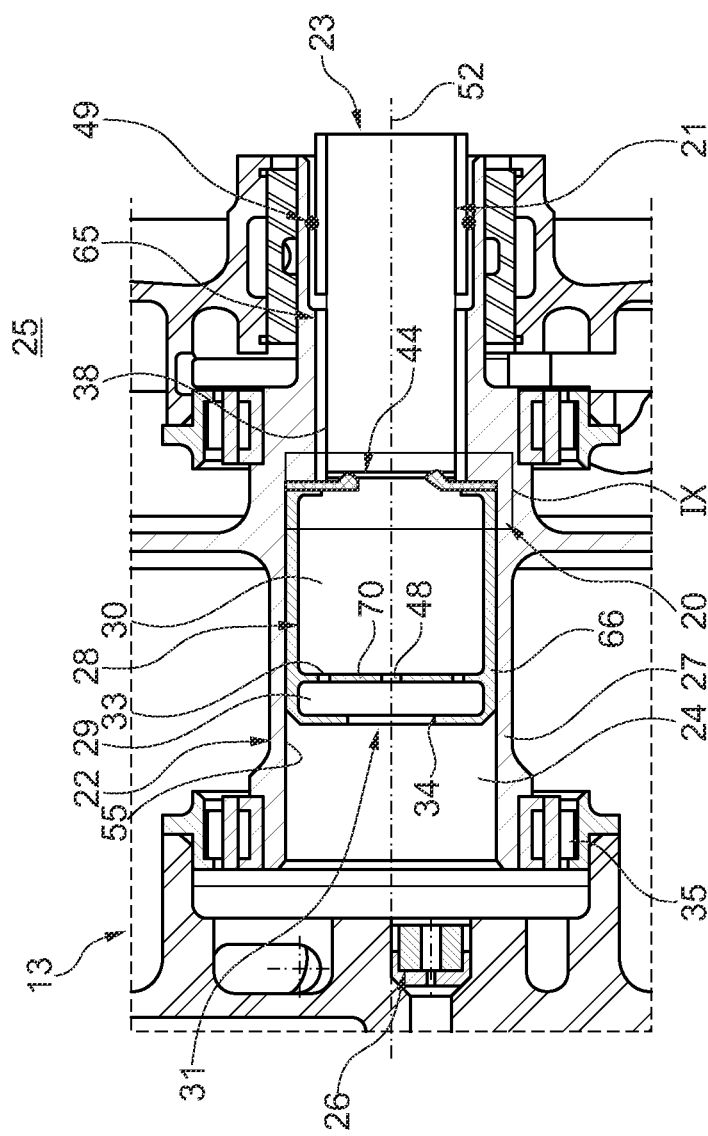
FIG. 8 shows an illustration, corresponding to FIG. 2, of a further embodiment of the auxiliary unit gearbox, in which a sealing element is mounted between an oil distributor and a step of the drive shaft of the auxiliary unit gearbox.

FIG. 8 and FIG. 9 show a further embodiment of the apparatus 20, in which the sealing element 36 is designed as a separate component and is in the shape of an annular disk. FIG. 9 shows an enlarged view of a region IX, indicated specifically in FIG. 8. The annular-disk-shaped sealing element 36 is mounted in the axial direction between the oil distributor 28 and the axial stop 39. The apparatus 20 that can therefore be integrated in a simple manner and with little structural outlay in existing gas turbine engines or in existing auxiliary unit gearboxes and, firstly, an undesirable escape of oil from the interior 24 of the auxiliary unit gearbox 13 in the direction of the environment 25 can be avoided and, secondly, a desired oil lubrication of the rotationally fixed connection between the shafts 22 and 23 can be ensured.

Furthermore, FIG. 9 shows a comparison of the dynamic oil levels 32 and of the static oil levels 46 and 47 in the two chambers 29 and 30. Below an axis of rotation 52 of the shafts 22 and 23, the chambers 29 and 30 are shown during the normal operation of the gas turbine engine 1, during which the filling level in the chambers 29 and 30 corresponds to the dynamic oil level 32. Above the axis of rotation 52, the chambers 29 and 30 are shown during a discharge operation of the gas turbine engine 1, during which the static oil level 46 in the first chamber 29 and the static oil level 47 in the second chamber 30 arise in each case to the previously described extent. Below the axis of rotation 52, the sealing element 36 therefore bears in a sealing manner against a partition 51 of the oil divider 28. In contrast thereto, the sealing element 36 opens up the connection 37 between the second chamber 30 and the third chamber 38 in the operating state illustrated above the axis of rotation 52.

FIG. 10 shows a further embodiment of the auxiliary unit gearbox 13 and of the apparatus 20, while FIG. 11 shows an enlarged view of the region XI indicated specifically in FIG. 10. In the embodiment of the auxiliary unit gearbox 13 according to FIG. 10, the oil divider 28 comprises two parts 28A and 28B. The first part 28A of the oil divider 28, which is a rotationally symmetrical, hollow-cylindrical component, bounds the first chamber 29. The second part 28B of the oil divider 28, together with the first part 28A, bounds the second chamber 30 within the hollow-cylindrical region 27 of the shaft 22. Oil is in turn introduced from the oil feed unit 26 through the central opening 31 of the first part 28A of the oil divider 28 into the first chamber 29. In the embodiment of the apparatus 20 according to FIG. 10 and FIG. 11, the sealing element 36 is mounted with a radial outer region 68 in an inner groove 50 of the second part 28B of the oil divider 28 and connected fixedly thereto.

Oil is introduced from the first chamber 29 via the connecting bores 33, which are provided in the outer circumference 66 of the first part 28A of the oil divider 28, substantially radially outward into the second chamber 30. Over the operating period, the dynamic oil levels 32 arise in turn in the chambers 29 and 30, which are bounded by the inside diameter Di31 of the central opening 31 and correspond to each other and are shown below the axis of rotation 52 in FIG. 11. FIG. 11 illustrates, above the axis of rotation 52, the static oil level 47 which arises in the second chamber 30 during a discharge operation of the gas turbine engine 1.

The dynamic oil level 32 in the second chamber 30 has the effect, in conjunction with rotational speeds of the shafts 32 and 23 above the rotation threshold, that the sealing element 36 is pressed to the previously described extent with its free inner edge region 42 in a sealing manner against a boundary wall 51 or partition of the oil divider 28. The partition 51 separates the second chamber 30 from the third chamber 38. The connection 37 which runs through the partition 51 between the second chamber 30 and the third chamber 38 is then blocked by the sealing element 36. This is in turn brought about by the hydraulic compressive force which acts on the sealing element 36 in the axial direction and results from the oil volume located in the second chamber 30 and the centrifugal force acting thereon above the rotational speed threshold. In addition, the second part 28B of the oil divider 28 comprises radial bores 60 via which oil is conducted out of the second chamber 30 in the direction of a further bearing unit 61.

Figure 12:
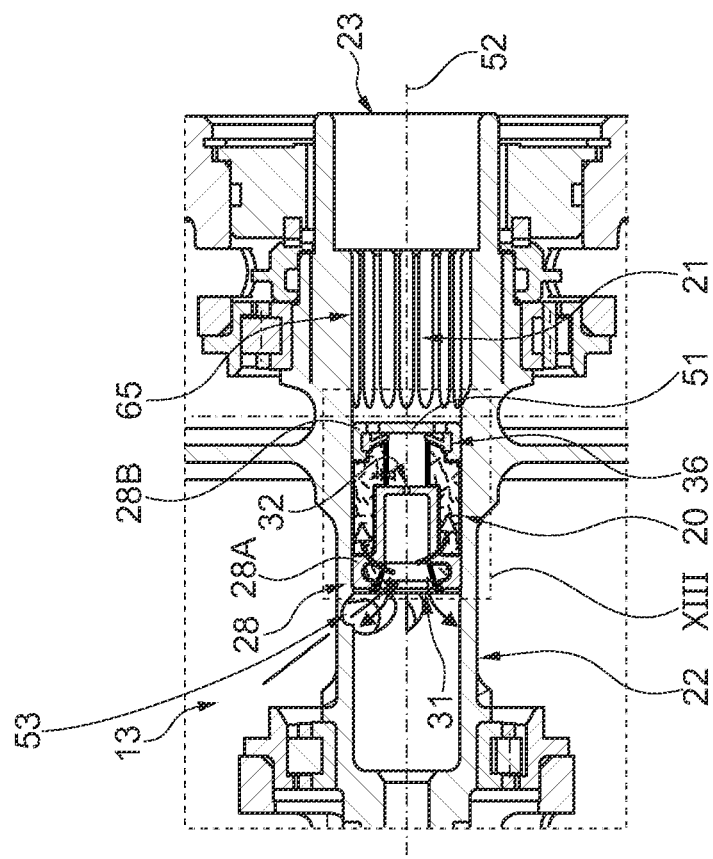
FIG. 12 shows an illustration, corresponding to FIG. 2 of a further embodiment of the auxiliary unit gearbox.

FIG. 12 shows a further embodiment of the auxiliary unit gearbox 13 and of the apparatus 20 in an illustration, corresponding to FIG. 2, in a switched-on operating state of the gas turbine engine 1 and at a rotational speed of the shafts 22, 23 above the rotational speed threshold. The dynamic oil levels 32 then arise in each of the two chambers 29 and 30.

Figure 13:
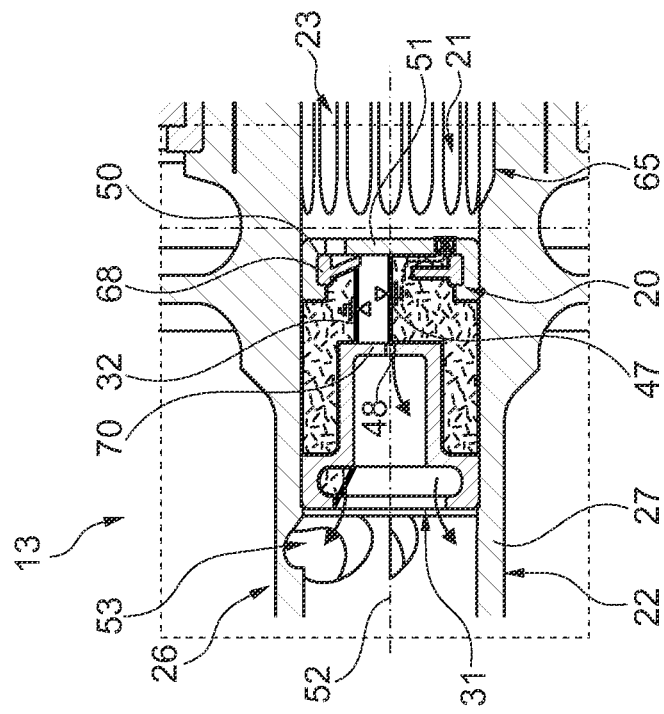
FIG. 13 shows an enlarged view of a region XIII, indicated specifically in FIG. 12.

FIG. 13 in turn illustrates a comparison of the dynamic oil levels 32 and the static oil levels 46 and 47 in the two chambers 29 and 30 in an enlarged view of a region XIII, indicated specifically in FIG. 12. Above the axis of rotation 52 of the shafts 22 and 23, the chambers 29 and 30 are filled with oil corresponding to the dynamic oil levels 32 while there is a respective oil volume corresponding to the static oil level 46 or 47 in the chambers 29 and 30 below the axis of rotation 52. Above the axis of rotation 52, the sealing element 36 therefore bears in a sealing manner against the partition 51. In contrast thereto, the sealing element 36 opens up the connection 37 between the second chamber 30 and the third chamber 38 in the operating state illustrated below the axis of rotation 52.

The oil divider 28 is in turn divided and comprises the two parts 28A and 28B, between which the second chamber 30 is provided within the hollow-cylindrical region 27 of the shaft 22. The connecting bores 33 between the first chamber 29 and the second chamber 30 run in the axial direction through the first part 28A of the oil distributor 28. The oil feed unit 26 comprises introduction openings 53 which lead radially from the outside through the shaft 22 into the hollow-cylindrical region 27 of the shaft 22. Oil can be introduced through the shaft 22 into the first chamber 29 via the introduction openings 53.

Figure 14:
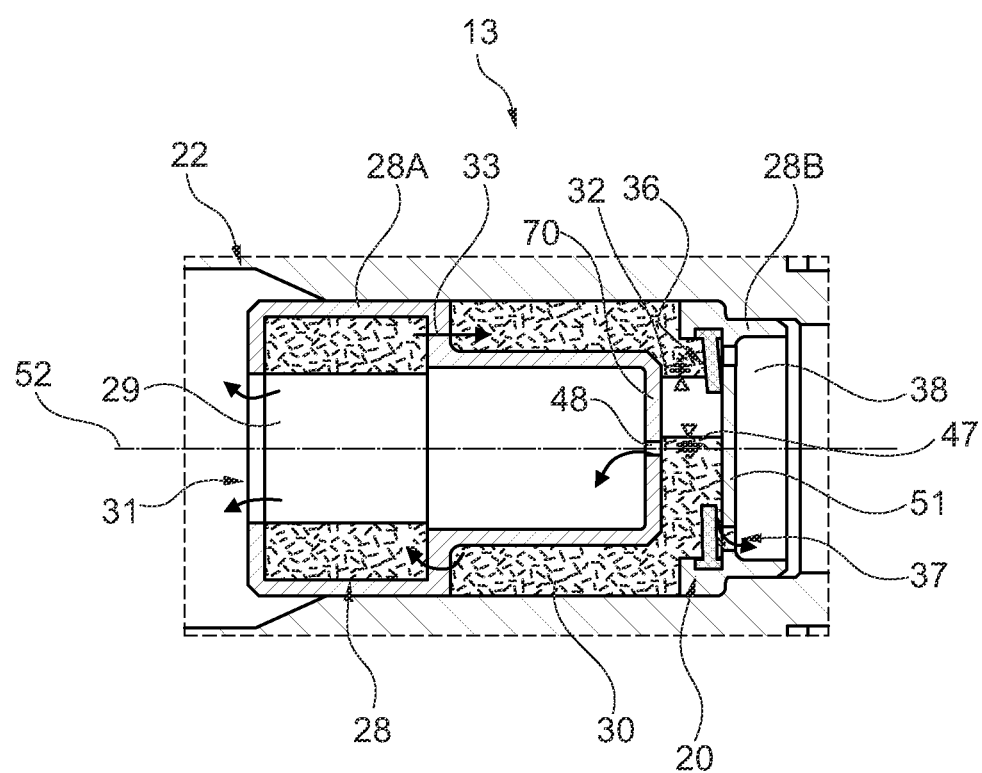
FIG. 14 shows an enlarged view of a further embodiment of the auxiliary unit gearbox.

FIG. 14 shows an illustration, corresponding to FIG. 13, of a further embodiment of the auxiliary unit gearbox 13 and of the apparatus 20, which substantially corresponds to the embodiment of the auxiliary unit gearbox 13 and of the apparatus 20 shown in FIG. 12 and FIG. 13. The first part 28A bounds the second chamber 30 in the axial direction and also, at least in regions, in the radial direction. In this embodiment of the auxiliary unit gearbox 13, there is in each case a smaller oil volume in the second chamber 30 during operation of the gas turbine engine 1 and also during the switching-off operation than is the case in the embodiment of the auxiliary unit gearbox 13 according to FIG. 13.

FIG. 15 shows a further embodiment of the auxiliary unit gearbox 13 and of the apparatus 20. The sealing element 36 according to FIG. 15 is supported with a radial outer region 54 on an inner side 55 of the hollow-cylindrical region 27 on the second shaft 22 with an axial region 56 on the shaft end 44 of the shaft 23 and with a further axial region 57 on the hollow-cylindrical component or on the oil divider 28 or on the second part 28B of the oil divider 28. The annular-disk-shaped region 41 of the sealing element 46 is applied by the oil volume in the second chamber 30 against the shaft end 44 of the shaft 23 in a sealing manner when the dynamic oil level 32 arises in the second chamber 30. The connection 37 between the second chamber 30 and the third chamber 38 is then separated or blocked in a sealing manner. In the embodiment of the apparatus 20 according to FIG. 15, the connection 37 is provided running through the axial region 56 of the sealing element 36. Via the sealing element 36 according to FIG. 15, an axial distance between the second part 28B of the oil divider 28 and the end side or end face 43 of the shaft end 44 of the shaft 23 can be compensated for in a simple manner.

If the gas turbine engine 1 transfers to the previously described extent during a switching-off operation into an operating state in which the static oil level 47 arises in the second chamber 30, the annular-disk-shaped region 41 of the sealing element 36 springs back in the manner illustrated in FIG. 17 from the deformed state illustrated in FIG. 16 and opens up the connection 37 between the second chamber 30 and the third chamber 38, and therefore oil flows out of the second chamber 30 into the third chamber 38.

The second part 28B of the oil divider 28 according to FIG. 15 has six outlet bores 58 which are arranged distributed uniformly over the circumference of the second part 28B of the oil divider 28 and via which oil can be conducted from the second chamber 30 to a further bearing unit of the shaft 22.

LIST OF REFERENCE SIGNS

1 Gas turbine engine
2 Bypass flow channel
3 Inlet region
4 Blower
5 Engine core
6 Compressor device
7 Separator
8 Turbine device
9 to 11 Rotor of the turbine device
12 Engine shaft
13 Auxiliary unit gearbox
14 Engine housing
15 Drive shaft
16 Auxiliary unit
17 Inner gearbox
18 Oil tank
19 Component
20 Apparatus
21 Rotationally fixed connection
22 Shaft
23 Shaft
24 Interior of the auxiliary unit gearbox 13

25 Environment of the auxiliary unit gearbox 13
26 Oil feed unit
27 Hollow-cylindrical region of the shaft 22
28 Oil distributor
28A, 28B Parts of the oil distributor
29 First chamber
30 Second chamber
31 Central opening of the oil distributor
32 Dynamic oil level
33 Connecting bores between the first chamber and the second chamber
34 Ring region
35 Bearing unit
36 Sealing element
37 Connection between the first chamber and the third chamber
38 Third chamber
38A Oil volume in the third chamber 28
39 Axial stop
40 Stop surface of the stop 39
41 Annular disk region of the sealing element
42 Free inner edge region of the annular disk region
43 End face of the shaft 23
44 Shaft end of the shaft 23
45 Sealing bead or sealing lip of the sealing element
46, 47 Static oil level
48 Central venting bore of the second chamber
49 Further seal
50 Inner groove of the oil distributor
51 Boundary wall
52 Axis of rotation
53 Introduction opening
54 Radial outer region of the sealing element 36
55 Inner side of the shaft 22
56 Axial region of the sealing element 36
57 Further axial region of the sealing element
58 Discharge bores of the second part 28B of the oil distributor 28
60 Radial bore
61 Further bearing unit
65 Overlapping region
66 Outer circumference of the oil distributor
67 Flat sealing disk region
68 Radial outer region of the sealing element
70 Radial wall region
A Core flow
B Bypass flow
Di31 Inside diameter of the central opening 31
Di39 Inside diameter of the axial stop 39
Di41 Inside diameter of the annular disk region 41

The invention claimed is:

1. An apparatus for oil lubrication of a rotationally fixed connection between two shafts, comprising:
the two shafts including a first shaft and a second shaft, with the first shaft engaging with a shaft region in a hollow-cylindrical shaft region of the second shaft, and the two shafts are operatively connected to each other in a form-fitting manner in an overlapping region,
wherein oil is introduced in an axial direction through a central opening into a first chamber in a hollow-cylindrical region of the second shaft, the first chamber being fluidically connected to a second chamber in the hollow-cylindrical region of the second shaft by a first fluidic connection,
wherein the second chamber is fluidically connectable to a third chamber by a second fluidic connection,
wherein the third chamber is arranged in the overlapping region between the first shaft and the second shaft, and
a sealing element, wherein the second fluidic connection between the second chamber and the third chamber is separated above a defined oil volume in the second chamber and above a rotational speed threshold of the two shafts via thea sealing element which is reversibly deformable at least in regions by the defined oil volume in the second chamber and a centrifugal force acting thereon and, in a deformed state, seals the second fluidic connection between the second chamber and the third chamber in relation to the second chamber.

2. The apparatus according to claim 1, wherein an inside diameter of the central opening, an outside diameter of the first chamber, an outside diameter of the second chamber and the first and second fluidic connections are coordinated with one another such that, above the rotational speed threshold of the two shafts, a defined oil level respectively arises in the first chamber and in the second chamber, and the sealing element is reversibly deformed at least in regions by the defined oil volume in the second chamber and the centrifugal force acting thereon and seals the second fluidic connection between the second chamber and the third chamber.

3. The apparatus according to claim 1, wherein the sealing element has an annular disk region which projects radially inwards into the second chamber and on which the oil volume present in the second chamber is supported in the axial direction, wherein at least one free inner edge region of the annular disk region is pressed by the oil volume in the second chamber in the axial direction against a free shaft end of the first shaft or against a boundary wall of the hollow-cylindrical shaft region, said boundary wall bounding the second chamber and the third chamber, and seals the second fluidic connection between the second chamber and third chamber if an oil volume above the defined oil volume is present in the second chamber and the rotational speed of the two shafts is greater than the rotational speed threshold.

4. The apparatus according to claim 3, wherein the at least one free inner edge region of the annular disk region of the sealing element is formed on a side facing the free shaft end of the first shaft with a sealing bead which extends in a circumferential direction of the sealing element.

5. The apparatus according to claim 3, wherein an inside diameter of the annular disk region of the sealing element at least approximately corresponds to an inside diameter of the central opening.

6. The apparatus according to claim 3, wherein an inside diameter of the annular disk region of the sealing element is smaller than an inside diameter of the central opening.

7. The apparatus according to claim 1, wherein the first fluidic connection between the first chamber and the second chamber comprises at least one passage opening, wherein the at least one passage opening runs from an outside diameter of the first chamber in a direction of the second chamber or in a radial direction between the outside diameter of the first chamber and an inside diameter of the central opening in the direction of the second chamber.

8. The apparatus according to claim 7, wherein the at least one passage opening is provided in a radial wall region which separates the first chamber from the second chamber in the axial direction of the two shafts.

9. The apparatus according to claim 8, wherein the radial wall region is formed with a further central opening in the radial direction of the two shafts, the further central opening connecting the first chamber and the second chamber.

10. The apparatus according to claim 1, and further comprising a hollow-cylindrical component arranged in the hollow-cylindrical shaft region and bounding the first, second and third chambers, the hollow-cylindrical component being fixed to the second shaft.

11. The apparatus according to claim 10, wherein the sealing element is formed integrally with the hollow-cylindrical component.

12. The apparatus according to claim 10, wherein the sealing element is arranged with a radial outer region in an inner groove of the hollow-cylindrical component and is connected fixedly to the hollow-cylindrical component.

13. The apparatus according to claim 10, wherein the hollow-cylindrical component comprises two parts, wherein the two parts of the hollow-cylindrical component are arranged in the hollow-cylindrical region of the second shaft spaced apart from each other in the axial direction of the two shafts, and, between the two parts of the hollow-cylindrical component, the second chamber is bounded by the two parts.

14. The apparatus according to claim 10, wherein the sealing element is supported with a radially outer region on the second shaft, with an axial region on a shaft end of the first shaft, and with a further axial region on the hollow-cylindrical component, wherein an annular disk region of the sealing element is movable by the oil volume in the second chamber against the shaft end of the first shaft in a sealing manner and separates a connection between the second chamber and the third chamber, which connection runs through the axial region of the sealing element.

15. The apparatus according to claim 10, wherein the hollow-cylindrical component is rotationally symmetrical.

16. The apparatus according to claim 1, wherein the sealing element lies in the axial direction on an annular contact surface of an axial step of the second shaft, wherein the annular contact surface of the axial step is spaced apart in the axial direction from a shaft end of the first shaft, and wherein an inside diameter of the annular contact surface is greater than an inside diameter of an annular disk region of the sealing element.

17. The apparatus according to claim 16, wherein the sealing element comprises at least one flat sealing disk region which is arranged between an end face of the hollow-cylindrical component and the annular contact surface of the axial step.

* * * * *